US011082717B2

(12) United States Patent
Gelman et al.

(10) Patent No.: US 11,082,717 B2
(45) Date of Patent: Aug. 3, 2021

(54) DATA COMPRESSION FOR COMMUNICATION IN SUBSEA OIL AND GAS SYSTEMS

(71) Applicant: OneSubsea IP UK Limited, London (GB)

(72) Inventors: Andriy Gelman, Somerville, MA (US); Julius Kusuma, Arlington, MA (US); Arnaud Jarrot, Somerville, MA (US); Neil Herbst, Houston, TX (US)

(73) Assignee: OneSubsea IP UK Limited, London (GB)

(*) Notice: Subject to any disclaimer, the term of this patent is extended or adjusted under 35 U.S.C. 154(b) by 50 days.

(21) Appl. No.: 16/027,408

(22) Filed: Jul. 5, 2018

(65) Prior Publication Data
US 2019/0014345 A1    Jan. 10, 2019

Related U.S. Application Data

(60) Provisional application No. 62/528,574, filed on Jul. 5, 2017.

(51) Int. Cl.
| | |
|---|---|
| *H04N 19/50* | (2014.01) |
| *H04N 19/59* | (2014.01) |
| *H04N 19/17* | (2014.01) |
| *H04N 19/124* | (2014.01) |
| *H04N 21/2343* | (2011.01) |
| *H04N 21/234* | (2011.01) |

(52) U.S. Cl.
CPC .......... *H04N 19/59* (2014.11); *H04N 19/124* (2014.11); *H04N 19/17* (2014.11); *H04N 21/23418* (2013.01); *H04N 21/234327* (2013.01); *H04N 21/234354* (2013.01); *H04N 21/234381* (2013.01)

(58) Field of Classification Search
None
See application file for complete search history.

(56) References Cited

U.S. PATENT DOCUMENTS

| | | | |
|---|---|---|---|
| 5,739,863 A * | 4/1998 | Ohtsuki | H04N 19/159 |
| | | | 375/240.04 |
| 8,184,276 B2 | 5/2012 | Embry | |
| 8,467,044 B2 | 6/2013 | Embry | |
| 8,929,176 B2 | 1/2015 | Debrunner et al. | |
| 8,942,062 B2 | 1/2015 | Debrunner et al. | |
| 9,223,025 B2 | 12/2015 | Debrunner et al. | |
| 9,229,108 B2 | 1/2016 | Debrunner et al. | |

(Continued)

OTHER PUBLICATIONS

Uma B.V. et al., "Simulation of H.264 based Real time Video Encoder for Underwater Acoustic Channel", International Journal of Current Engineering and Technology, vol. 4, No. 1, Feb. 1, 2014 (Feb. 1, 2014), pp. 1715-1718. (Year: 2014).*

(Continued)

*Primary Examiner* — Lindsay J Uhl
(74) *Attorney, Agent, or Firm* — Eileen Pape

(57) ABSTRACT

A method, subsea device, and system, of which the method includes acquiring data using one or more sensors of the subsea device, the data representing a subsea environment, compressing the data using one or more processors of the subsea device, transmitting the data wirelessly from the subsea device to the surface device, and decompressing the data using the surface device.

14 Claims, 9 Drawing Sheets

(56) References Cited

U.S. PATENT DOCUMENTS

| | | | |
|---|---|---|---|
| 2001/0023436 A1* | 9/2001 | Srinivasan | H04N 21/812 709/219 |
| 2007/0258518 A1* | 11/2007 | Tu | H04N 19/176 375/240.03 |
| 2009/0059026 A1* | 3/2009 | Katagiri | H04N 19/40 348/222.1 |
| 2009/0190850 A1 | 7/2009 | Tang | |
| 2013/0343668 A1 | 12/2013 | Li et al. | |

OTHER PUBLICATIONS

Fujihashi et al., "A preliminary study on multi-view video streaming over underwater acoustic networks", Underwater Technology Symposium (UT), 2013 IEEE International, IEEE, Mar. 5, 2013 (Mar. 5, 2013), pp. 1-5. (Year: 2013).*

Kaeli et al., "Online data summaries for semantic mapping and anomaly detection with autonomous underwater vehicles", Oceans 2015—Genova, IEEE, May 18, 2015 (May 18, 2015), pp. 1-7. (Year: 2015).*

Fujihashi et al., "A Preliminary Study on Multi-view Video Streaming over Underwater Acoustic Networks", 2013 IEEE International Underwater Technology Symposium (Mar. 2013) (Year: 2013).*

Partial European Search Report; EP Application No. 18181862.6; dated Feb. 20, 2019; 15 pages.

Takuya Fujihashi et al: "A preliminary study on multi-view video streaming over underwater acoustic networks", Underwater Technology Symposium (UT), 2013 IEEE Interntiona, IEEE, Mar. 5, 2013 (Mar. 5, 2013), pp. 1-5, XP032410841.

Jeffrey W. Kaeli et al.: "Online data summaries for semantic mapping and anomaly detection with autonomous underwater vehicles", Oceans 2015—Genova, IEEE, May 18, 2015 (May 18, 2015), pp. 1-7, XP033205637.

Doniec Marek et al.: "Robust real-time underwater digital video streaming using optical communication", 2013 IEEE International Conference on Robotics and Automation (ICRA); May 6-10, 2013; Karlsruhe, Germany, IEEE, US, May 6, 2013 (May 6, 2013), pp. 5117-5124, XP032506062.

Srividhya et al., "Accurate object recognition in the underwater images using learning algorithms and texture features", Multimed Tools Appl., vol. 76, No. 24, Feb. 15, 2017, pp. 25679-25695.

Extended European Search Report issued in European Patent Appl. No. 18181862.6 dated Jun. 26, 2019; 18 pages.

* cited by examiner

DATA COMPRESSION FOR COMMUNICATION IN SUBSEA OIL AND GAS SYSTEMS

CROSS-REFERENCE TO RELATED APPLICATIONS

This application claims priority to U.S. Provisional patent application having Ser. No. 62/528,574, which was filed on Jul. 5, 2017, and is incorporated herein by reference in its entirety.

BACKGROUND

In offshore oil and gas applications, real-time monitoring of seabed activities and equipment provides a greater level of safety and ensures that the operations conform to regulations. Remote Operated Vehicles (ROV) can be used to enable such monitoring. The ROVs are submerged to the location of the equipment and carry a series of sensors such as video, depth maps, LiDAR, sonar, pressure, and temperature sensors. These sensors collect information about the environment, which is transmitted to the surface via a high rate communication cable tethered to the ROV. Although the cable provides an excellent communication link, it can be expensive to use in deep locations. The cable can be several kilometers long and may call for a custom rig for deploying the ROV. For this reason, an emerging class of untethered ROVs (UROVs) are becoming a popular alternative.

UROVs support a wireless communication link, which can allow physical cable links with the surface to be omitted. UROVs can also be more mobile and cost-effective than their tethered counterparts. The UROVs are not without their own challenges, however. For example, the transmission rate over the wireless link is generally much lower than with tethered ROVs. This can lead to high latency in data transmission, sacrifices in quality of the data that is received at the surface, or both.

SUMMARY

Embodiments of the disclosure may provide a method for transmitting data from a subsea device to a surface device. The method includes acquiring data using one or more sensors of the subsea device, wherein the data represents a subsea environment, compressing the data using one or more processors of the subsea device, transmitting the data wirelessly from the subsea device to the surface device, and decompressing the data using the surface device.

Embodiments of the disclosure may also provide a subsea device. The subsea device includes one or more sensors configured to capture data representing a subsea environment, one or more processors for processing the data, a transmitter for transmitting data to surface equipment, and a non-transitory, computer-readable medium storing instructions thereon that, when executed by at least one of the one or more processors, cause the subsea device to perform operations. The operations include acquiring data using one or more sensors of the subsea device, the data representing the subsea environment, compressing the data using the one or more processors of the subsea device, and transmitting the data wirelessly from the subsea device to the surface device, wherein the data is configured to be decompressed using the surface device.

Embodiments of the disclosure may further provide a system including a subsea device including one or more sensors configured to capture data representing a subsea environment, one or more processors for processing the data, a transmitter for transmitting data to surface equipment, and a non-transitory, computer-readable medium storing instructions thereon that, when executed by at least one of the one or more processors, cause the subsea device to perform operations. The operations include acquiring data using one or more sensors of the subsea device, the data representing the subsea environment, compressing the data using the one or more processors of the subsea device, and transmitting the data wirelessly from the subsea device to the surface device. The system also includes a surface device including one or more processors configured to decompress the data transmitted from the subsea device.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Subsea Environment

Figure 1:
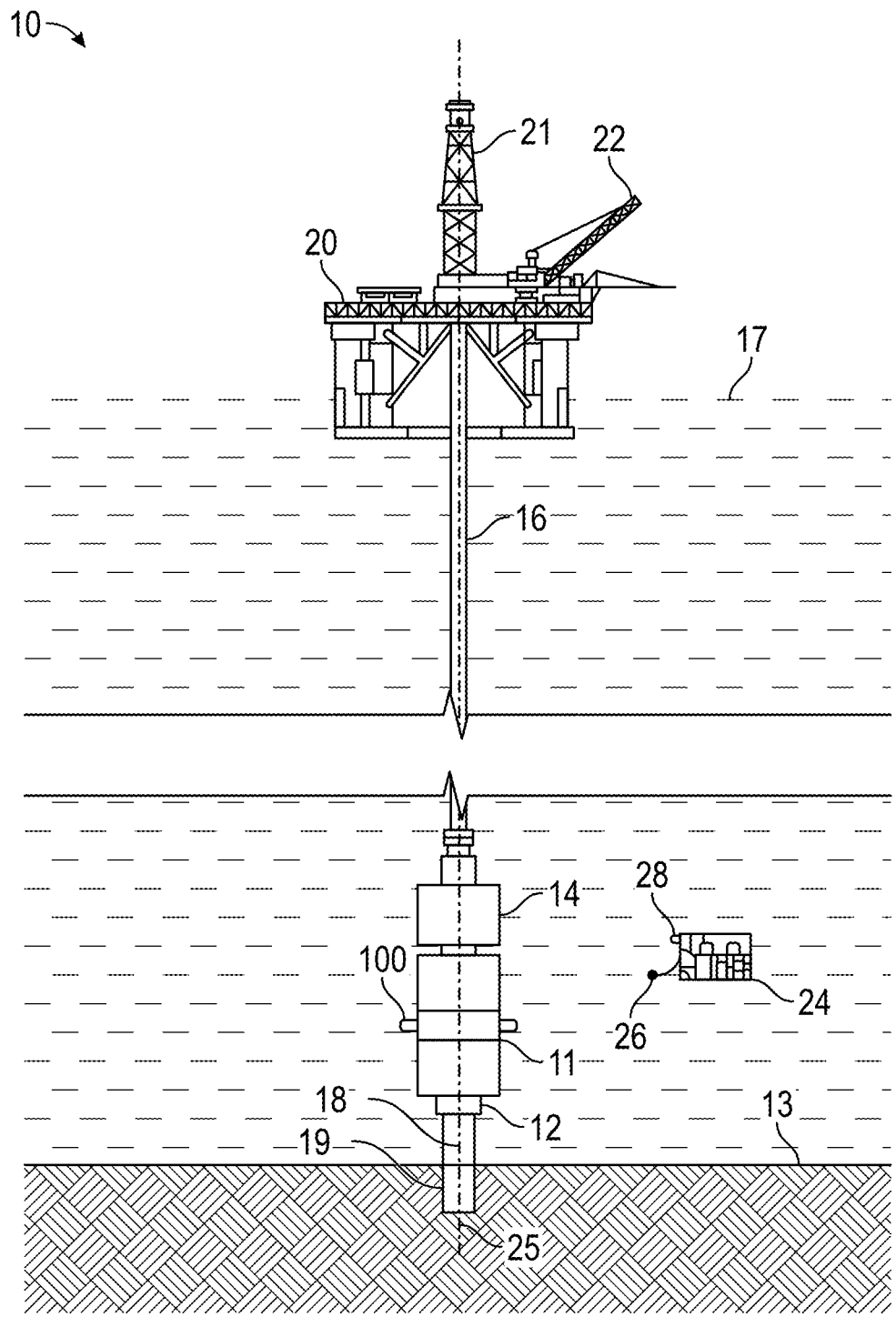
FIG. 1 illustrates a conceptual view of a subsea environment in which a subsea device (e.g., a UROV) may be employed, according to an embodiment.

FIG. 1 illustrates a conceptual view of a subsea environment including an offshore system 10 for drilling and/or producing a subsea well, according to an embodiment. In this embodiment, system 10 includes a subsea blowout preventer (BOP) stack 11 mounted to a wellhead 12 at the sea floor 13. The stack 11 includes a ram 100 attached to the upper end of the wellhead 12 and a lower marine riser package (LMRP) 14 connected to the upper end of the BOP stack 11. A marine riser 16 extends from a surface vessel 20 at the sea surface or waterline 17 to LMRP 14. In this embodiment, vessel 20 is a floating platform, and thus may also be referred to as a platform 20. In other embodiments, the vessel 20 may be a drill ship or any other vessel disposed at the sea surface for conducting offshore drilling and/or production operations.

The surface vessel 20 may include a drilling derrick 21 and a lifting device 22. The riser 16 is a large-diameter pipe that connects the LMRP 14 to floating platform 20. During drilling operations, the riser 16 takes mud returns to the platform 20. Further, the riser 16 is coupled to electrical and hydraulic lines (not shown) for powering and controlling the actuation of components of the BOP stack 11, including a subsea component or ram BOP 100. A primary conductor 18 extends from the wellhead 12 into the subterranean wellbore 19. The BOP stack 11, LMRP 14, wellhead 12, and conductor 18 are arranged such that each shares a common central axis 25. In other words, the BOP stack 11, LMRP 14, wellhead 12, and conductor 18 are coaxially aligned. In addition, the BOP stack 11, LMRP 14, wellhead 12, and conductor 18 are vertically stacked one-above-the-other, and the position of the platform 20 is controlled such that axis 25 is vertically or substantially vertically oriented.

The offshore system 10 also includes a remotely operated underwater vehicle (ROV) 24 disposed below the waterline 17. The ROV 24 may be untethered (and thus may be referred to herein as a UROV) from physical cables or lines that would connect the ROV 24 to the surface vessel 20, and may thus communicate with devices (e.g., processors, modems, etc.) of the surface vessel 20 via wireless telemetry. The ROV 24 may include an internal power supply and an antenna for wirelessly transmitting signals to the surface vessel 20. Further, ROV 24 may be autonomous or semi-autonomous.

The ROV 24 may further include an actuatable arm or gripper 26 and control devices 28. The gripper 26 is configured to actuate particular components of the LMRP 14 and the BOP stack 11. The control devices 28 may include processors, sensors, and/or transmitters, among other potential equipment. For example, the control devices 28 may include an optical sensor configured to capture still images and/or video, and/or a LiDAR sensor, or any other type of sensor configured to acquire data representing the subsea environment. For example, the sensor(s) of the control devices 28 may collect point cloud data, which may be used to map the terrain and/or structures of the subsea environment. The data collected may be processed by one or more processors of the control equipment 28 of the ROV 24 and transmitted, e.g., substantially in real time, to the platform 20, via a transmitter of the control equipment 28.

Thus, in this configuration, personnel on surface vessel 20 may observe the BOP stack 11, LMRP 14, wellhead 12, and other subsea components of offshore system 10 in real time utilizing ROV 24. Furthermore, the point cloud data may be employed to map the topography of the seabed, the placement of the system 10 structures, etc. The surface vessel 20 may include control equipment, e.g., receivers, transmitters, sensors, processors, configured to receive and process data from the ROV 24.

Although the subsea environment 10 illustrated generally shows a drilling operation, it will be appreciated that embodiments of the present disclosure may be employed in, as part of, or to other types of subsea environments. In particular, some embodiments may be used with production environments, in which wells that have been previously drilled, along with the well equipment, are controlled, maintained, otherwise adjusted for extracting hydrocarbons.

Transmission Method

Figure 2:
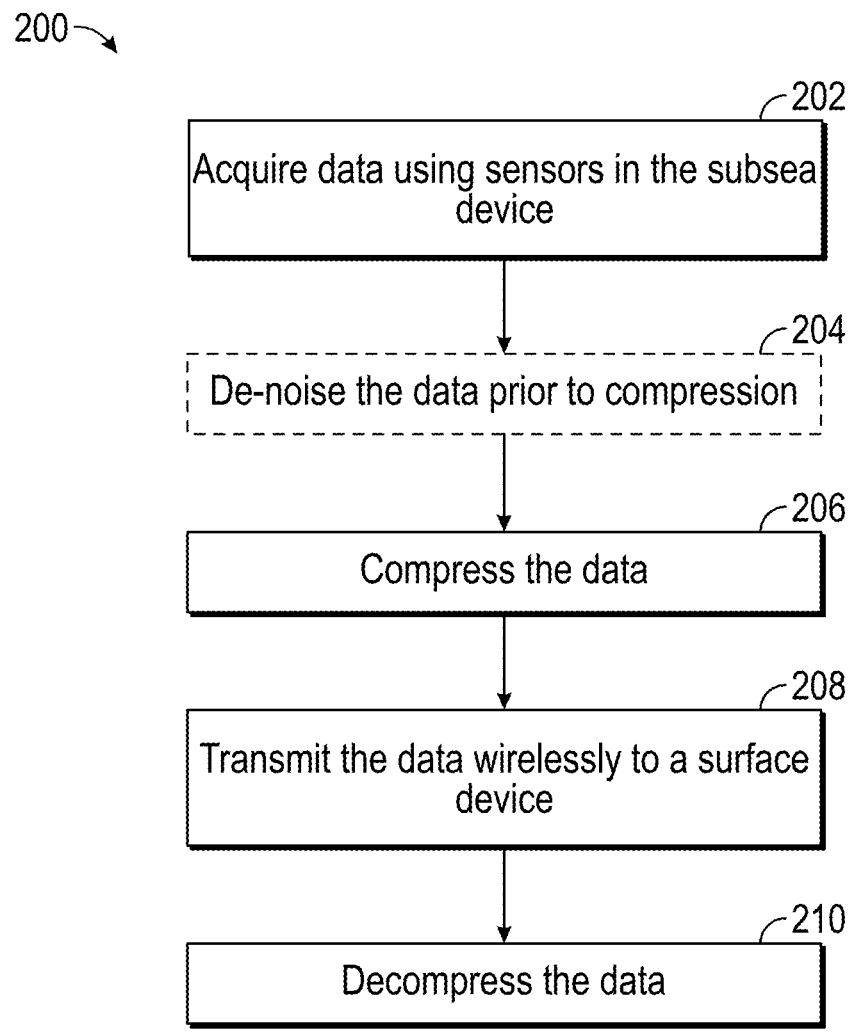
FIG. 2 illustrates a flowchart of a method for transmitting data in from a subsea device to a surface device, which may include de-noising and/or compression process(es), according to an embodiment.

FIG. 2 illustrates a flowchart of a method 200 for transmitting data from a subsea device (e.g., the ROV 24) to a surface device (e.g., the platform 20), as part of the system 10 shown in FIG. 1, according to an embodiment. The method 200 may include acquiring data using sensors in the subsea device, as at 202. The data may be representative of the subsea environment, including natural (e.g., seabed topography) and/or man-made structures (e.g., well equipment, conduits, risers, templates, etc.) present. Further, the data may be point-cloud data (e.g., LiDAR) and/or any other visualization data (e.g., video or optical images).

In some situations, the subsea device (e.g., a UROV) may include processors configured to perform operations on the data, prior to transmitting the data to the surface. The operations may, in some embodiments, including de-noising the data, as at 204. Data de-noising may include comparing data from two or more data sets representing the same area and determining likely outlier/spurious data points. This may increase the effectiveness of later-applied compression techniques. In other embodiments, the data may not be de-noised prior to transmission. Additional discussion of data de-noising is provided below, according to an embodiment.

The subsea device may also compress the data, e.g., using one or more of several available compression processes, as at 206. Such compression processes may include down/up scaling, quantization, vector quantization, entropy coding, model-based data substitution, and others. Examples of such compression that may be applied by the subsea device prior to or in parallel to transmitting the data are discussed below Once compressed (or potentially parallel with such compression processing), the data may be transmitted to the surface, as at 208. The data transmission may proceed wirelessly, e.g., via radiofrequency transmission, or via any other suitable transmission medium. The data transmission may, for example, be partial, e.g., depending on the data compression regime. For example, as will be described below, if down-scaling is used, the lower-resolution byte streams may be transmitted to the surface, and the higher-resolution may be transmitted in response to a user selection, or potentially not at all, e.g., to maintain bandwidth for other data to be transmitted. Moreover, an indication of a predetermined model of a standard structure may be sent to the surface, along with the prediction error between the predetermined model and the data, rather than data that explicitly describes the modelled area.

At the surface, topside equipment may decompress the data, as at 210. The decompression may proceed as a complement to the compression algorithm used.

Data De-Noising

Regarding the data de-noising (e.g., as at block 204) in greater detail, according to an example, data, such as point cloud data or other visualization data may be corrupted by noise during acquisition. Noise and outliers are generally removed prior to visualization at the surface using median, Gaussian, and/or bilateral filtering. Encoding the outliers therefore takes up bandwidth during transmission. Embodiments of the present disclosure include de-noising prior to compressing the dataset, and then transmitting the de-noised, compressed dataset to the surface.

De-Noising Using Joint Signal Processing

During data acquisition, two or more sensors, e.g., all of the sensors, of the subsea device may be observing the same scene. Accordingly, accurate measurements from one sensor can be used to improve signal processing on the remaining data.

Figure 3:
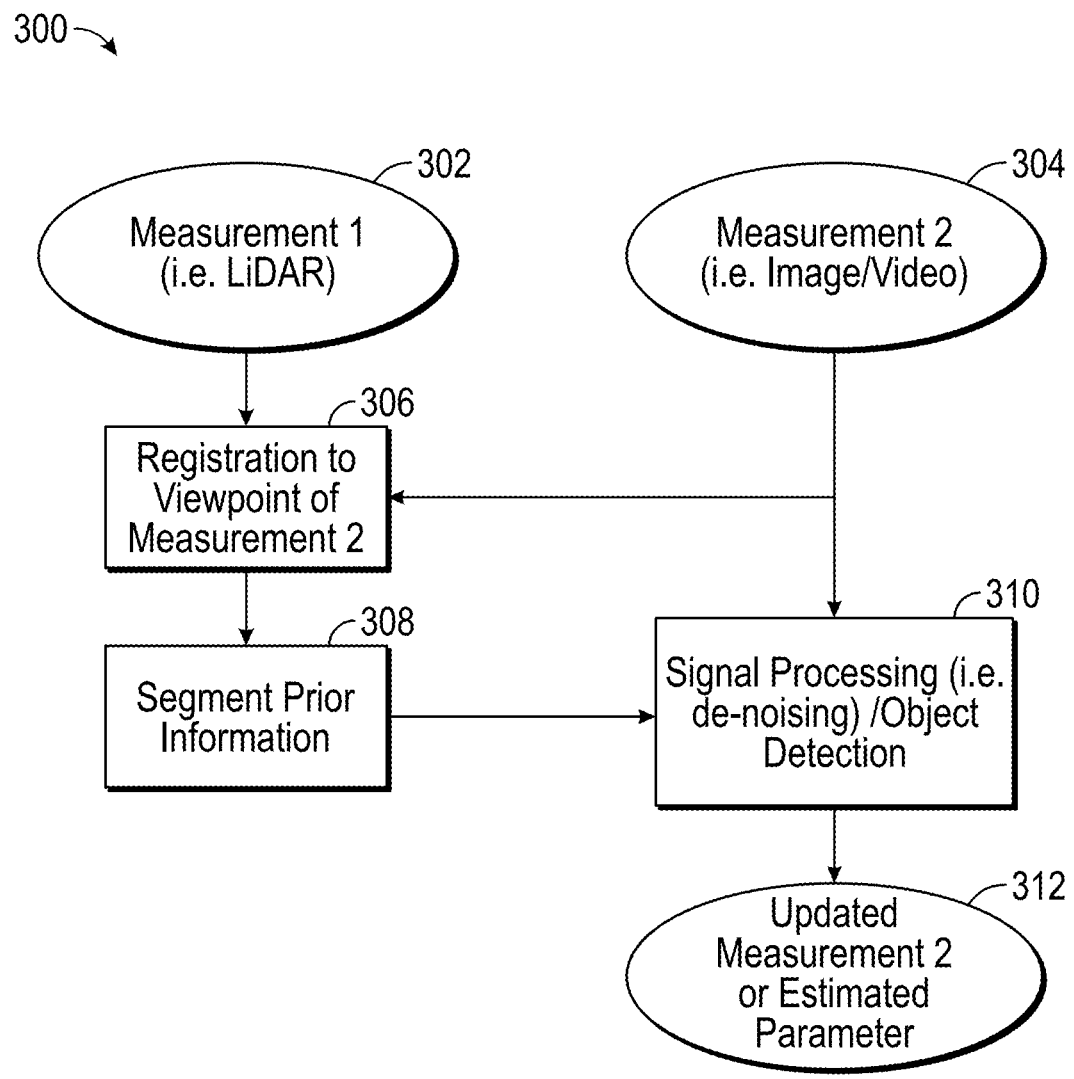
FIG. 3 illustrates a flowchart of a de-noising process, according to an embodiment.

FIG. 3 illustrates a flowchart of a de-noising process 300, which may capitalize on such data representing the same subsea environment scene, according to an embodiment. As an example, a first measurement (e.g., a LiDAR dataset) 302 may be employed to de-noise a second measurement 304 (e.g., an image) of the same scene. It will be appreciated that three or more measurements may be compared to perform the de-noising process 300 discussed herein. Moreover, although LiDAR is used as an example here, it will be appreciated that any point-cloud data could be employed, and any other visual or point-cloud data could be substituted for the optical image/video data.

Since the two datasets are from different measurements and viewpoints, a mapping function may be used to align the data, as at 306, to "register" the first measurement data to the viewpoint of the image/video measurement. Registration can be performed using any suitable process. The registration block 306 can also use side information from the image, such as the camera location and viewpoint. The registration block 306 may also use features extracted from the image and point cloud. The feature extraction and matching can use a scale invariant feature transform (SIFT) or any other feature descriptor algorithm.

After registration, the de-noising process 300 may include extracting information from the first measurement that is relevant to the second, as at 308, in order to evaluate prior information that is relevant for improving the performance of the de-noising process. This prior information can be extracted from the first measurement (e.g., point-cloud) dataset or by projecting the data onto a 2D depth map, and then extracting the prior information from a 2D depth map. In this example, prior information can be edge information, RGB color, pixel intensity or any other data descriptor.

The process 300 may then include de-noising (i.e., removing at least some of the noise from) the image or video sequence using the extracted priors, as at 310. Various different processes may be used to de-noise color and edge priors. The process 300 may then output an updated second measurement, de-noised by reference to the first measurement, and/or an estimated parameter. In this example, an estimated parameter can refer to a size of an object, or any other meaningful descriptor of an object.

Data Compression

Low Latency Point-Cloud Data Compression

As mentioned above with reference to FIG. 1, the data may be compressed by the subsea device prior to or during transmission to the surface devices, which may enhance use of the small bandwidth available for the transmission. In some embodiments, a three-dimensional point cloud may be compressed and transmitted. The point cloud may be, for example, a LiDAR dataset. Each of the datapoints in the LiDAR dataset may be defined by a vector $L_i=[(x_i, y_i, z_i), \alpha_i, \beta_i, \ldots]$, where i corresponds to the i-th datapoint. The first three variables $(x_i, y_i, z_i)$ define the location of the data point in a 3D space. The remaining variables $(\alpha_i, \beta_i, \ldots)$ correspond to additional properties associated with the data; this may be for example illuminance, opacity, or an RGB vector. There may be millions of data points in a scene depending on the acquisition resolution. In some compression algorithms, the datapoints are compressed in a particular order—$L_0, L_1, \ldots$ To view the complete scene, a user generally waits until the complete byte stream is received at the surface and this creates a latency.

Figure 4:
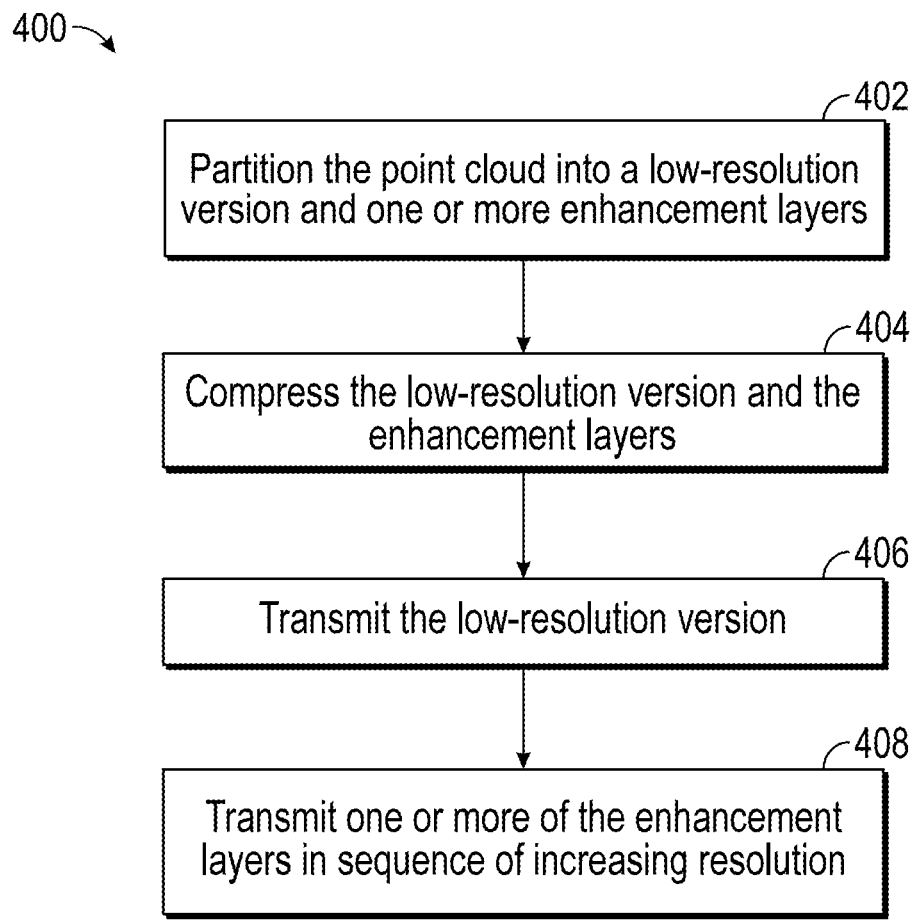
FIG. 4 illustrates a flowchart of a compression process, according to an embodiment.

FIG. 4 illustrates a flowchart of a compression process 400 that may compress such point cloud data, e.g., as an embodiment of the compression block 206 of FIG. 2. The process 400 may include partitioning the point cloud into a low resolution version and several enhancement layers, e.g., as at 402. Each of the layers is then compressed to a respective byte stream, as at 404. The low-resolution byte stream may then be transmitted to the surface, as at 406. The higher-resolution byte streams, for example, in order of increasing resolution, may then be sent to the surface, as at 408. Accordingly, a user can view a low resolution version of the data at a low latency and view a progressive improvement of the quality (number of data points). The enhanced layers may be sent for areas/regions selected by a user, or if a scene stays in the user's view for a period of time. The enhanced layers may also be stored/uploaded at a later time.

Figure 5:
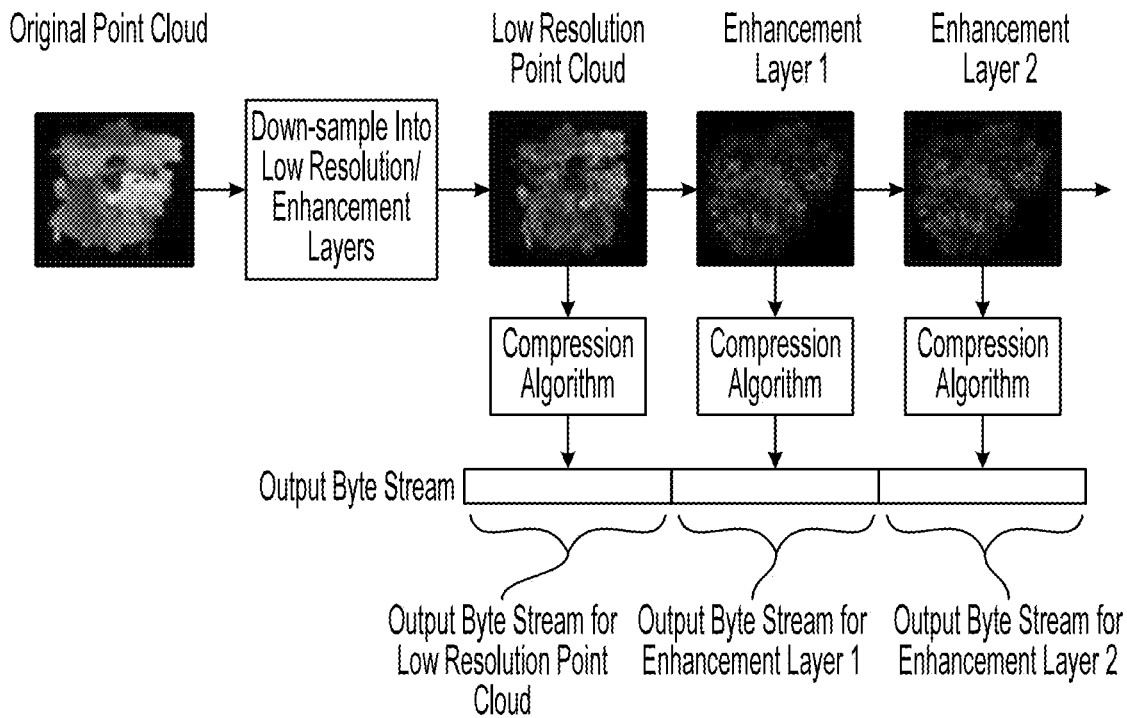
FIG. 5 illustrates a conceptual view of the compression process of FIG. 4, according to an embodiment.

An example of the decompressed dataset for different truncation points is shown in FIG. 5. Observe that a complete scene is visible when 50% of the byte stream has been received. This may be an enhancement over conventional techniques, which may require a greater percentage of the truncated point cloud to be received to provide even a rough image of the entire scene.

Adaptive Scalar/Vector Quantization

Figure 6:
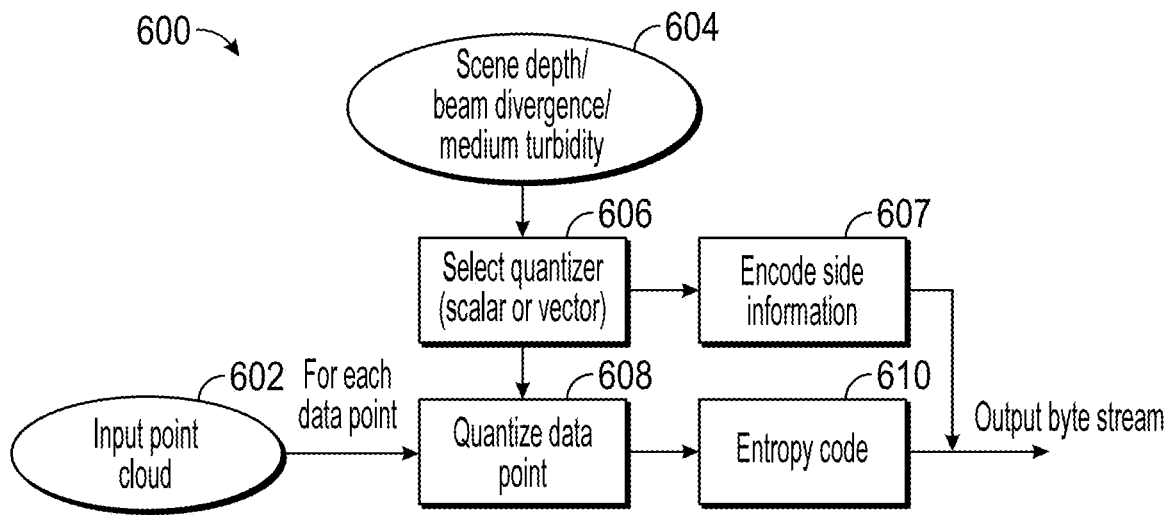
FIG. 6 illustrates a flowchart of another compression process, according to an embodiment.

FIG. 6 illustrates a flowchart of a compression process 600, according to an embodiment, which may be applied to a point-cloud dataset. For example, each data point in the point cloud dataset is defined by a location in a 3D space ($x_i$, $y_i$, $z_i$), and an intensity/RGB measurement. During acquisition, these variables can be corrupted by noise, where the level of noise/uncertainty is determined by the beam divergence, scene depth and turbidity of the medium.

The level of noise on the spatial coordinates ($x_i$, $y_i$,) is different to the noise along the $z_i$ dimension, for example. Thus, a quantizer with a varying step-size may be used to compress each dimension. For example, a larger quantization step-size may be used on data where there is a high-level of uncertainty, whereas a smaller step-size may be used on dimensions with low noise.

Referring to the embodiment shown in FIG. 6, which may implement such a quantizer, the process 600 may include receiving the input point cloud, as at 602. The process 600 may also receive scene depth, beam divergence, and/or medium turbidity as input parameters, as at 604.

At least partially based on these input parameters, the process 600 may include selecting a quantizer, as at 606. A scalar quantizer with a varying step-size along each dimension may be employed, or a vector quantizer that is adjusted after encoding each data point may be used. Also, a set of predefined quantizers can be employed, or updated on-the-fly during transmission, for example using Generalized Loyd algorithm. During the decompression, the same update can be made using the received data point. Any information which cannot be inferred may be transmitted as side information, as at 607. The user can also downlink and update the quantization parameters, including step-sizes for each dimension or vector quantization code-books.

The quantizer may be applied to the point cloud to quantize the data points, as at 608. Further, an entropy code may be defined at 610. Entropy code generally refers to a general, reversible, data compression technique. Quantization can also be viewed as data compression, but unlike entropy coding it is not a reversible process, or in other words, is a lossy compression.

Model-Assisted Data Compression

In some situations, e.g., maintenance of subsea structures, the structures the UROV observes may be predicted, e.g., based on previous images of the scene. Models of the structures may also be predetermined. Embodiments of the present disclosure may employ such models for compression of point cloud or visualization data, e.g., substituting a reference to a particular model in a library for the data representing the modeled structure.

Figure 7:
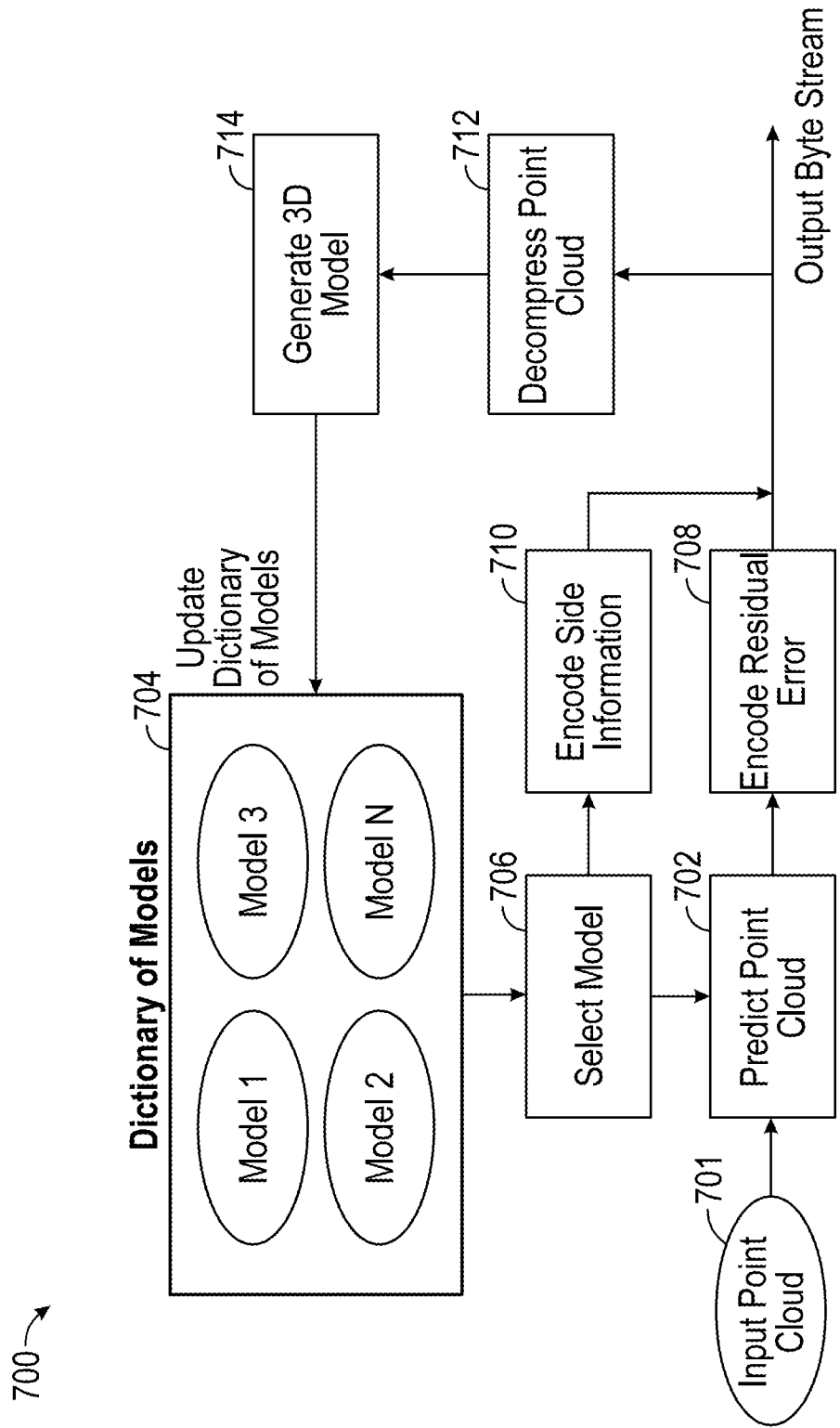
FIG. 7 illustrates a flowchart of another compression process, according to an embodiment.

A flowchart of an example of such a compression process 700 is shown in FIG. 7. The process 700 may include receiving an input cloud point data set, as at 701. The process 700 may then predict a point cloud, as at 702, representing at least a portion of the input point cloud data set. In order to do this, a set of dictionary models 704 may be stored in the subsea device, and corresponding models may be stored at the surface. The models may represent predefine structures, whether generic or specific to the particular subsea environment being observed.

During compression, one of the models may be selected, as at 706. The model may be selected as a best-fit (or any other comparison) of the input point cloud to the dictionary models.

The selected model is used as a prediction to encode the point cloud locations at 702. The residual error is compressed by using quantization and entropy coding, and transmitted to the surface as at 708, along with any compressed side information. In this example, side information can refer to the indication of the selected model, step-size for quantizing the residual error, entropy coding parameters, or any other information that is needed to decompress the dataset at the surface.

In some embodiments, when the model error is nonzero, the process 700 may include generating a new model based on the selected model and the compressed residual error. This may be accomplished, for example, by the subsea device decompressing its output (selected model and entropy data), as at 710, and then generating the new model based on this data, as at 712. In another embodiment, the uncompressed data may be employed to generate the new model, without compressing/decompressing. The new model may then be added to the dictionary of models 702, and the same new model (or update to an old model) may be added to the dictionary of models at the surface. The new models may receive unique identifiers, which allow the subsea device and the surface device to pass references to models therebetween.

Frame Rate Video Down-Sampling

A video feed is generally a collection of images acquired by a camera on the subsea device. The images are sampled at a particular frame, e.g., 30 or 50 frames per second (fps). In general, a higher frame rate calls for an increase in the bit rate (this relation may not be linear, however, because the increased inter-frame correlation can be removed by a compression algorithm). To increase the compression ratio, the video stream may be down-sampled to a lower frame rate, e.g., 10 fps. Further, this video sequence may be encoded. At the decompression stage, the video is then up-sampled to the original frame rate using image processing techniques.

Figure 8:
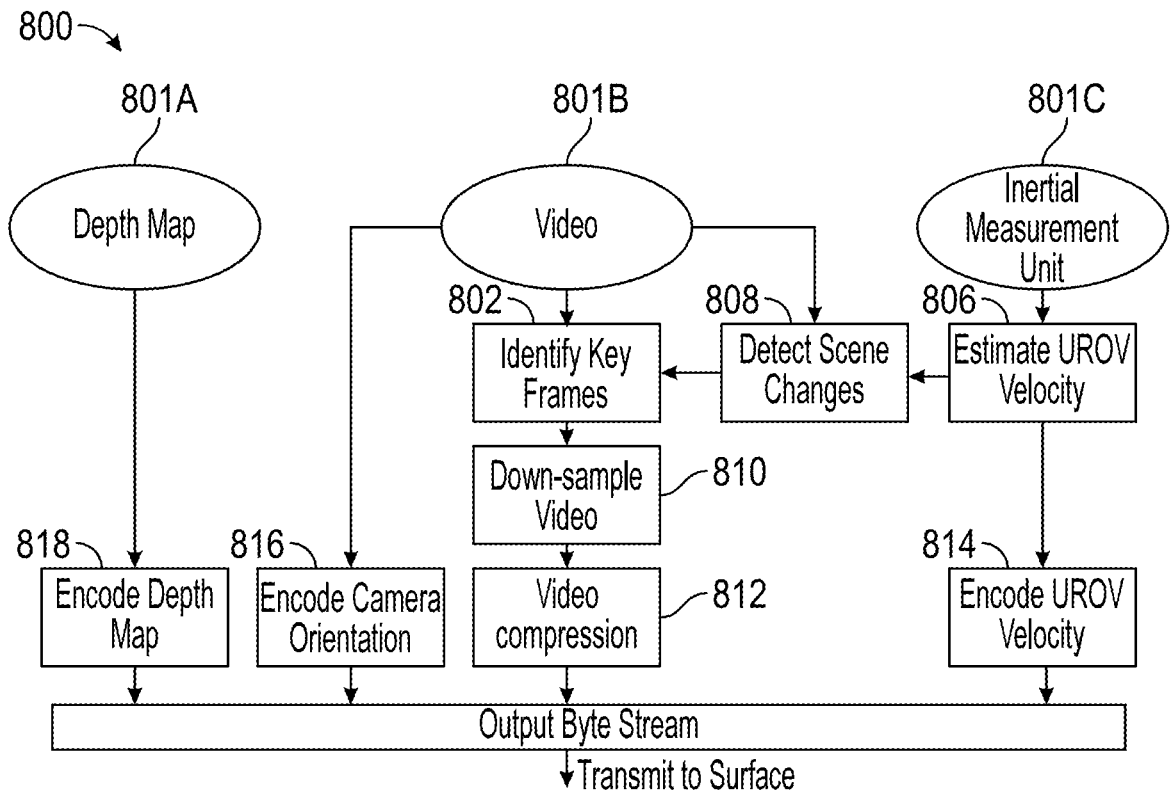
FIG. 8 illustrates a flowchart of another compression process, according to an embodiment.

An example workflow of a compression process 800 is shown in FIG. 8. The process 800 may begin by receiving a depth map at 801A, a video at 801B, and an internal measurement unit at 801C. The process 800 may proceed to identifying at 802 which frames in the video should be compressed. To do this, the process may include identifying the retained frames as "key frames." Key frames may be selected by uniform subsampling, where one of every N frames is selected as a key frame.

Key frames may also or instead be identified at 802 using content-based subsampling. Changes in scene can indicate that subsequent frames are different from previous frames. Moreover, frames with high motion are usually more challenging to interpolate and may therefore be sent to the surface as a selected frame.

Key frames may also or instead be determined at 802 by the velocity of the subsea device, in which the velocity of the subsea device can also be used to select which frames should be retained. Retained frames may be selected when the velocity of vehicle suddenly changes. For example, based on the subsea device's velocity, which can be estimated at 806, changes in scene may be detected at 808. It will be appreciated that acceleration may be employed in order to make this determination as well.

After the key frames have been selected, the remaining frames may be removed in the down-sampling stage, as at 810. The down-sampled video, corresponding to a lower frame rate can then be compressed using a video compression algorithm, such as x264, as at 812

In addition to encoding the video stream, the UROV velocity, the camera orientation, and a low-resolution depth map can be compressed and transmitted, as at 814, 816, and 818, respectively. These variables can be used for interpolation of missing frames at the surface.

Figure 9:
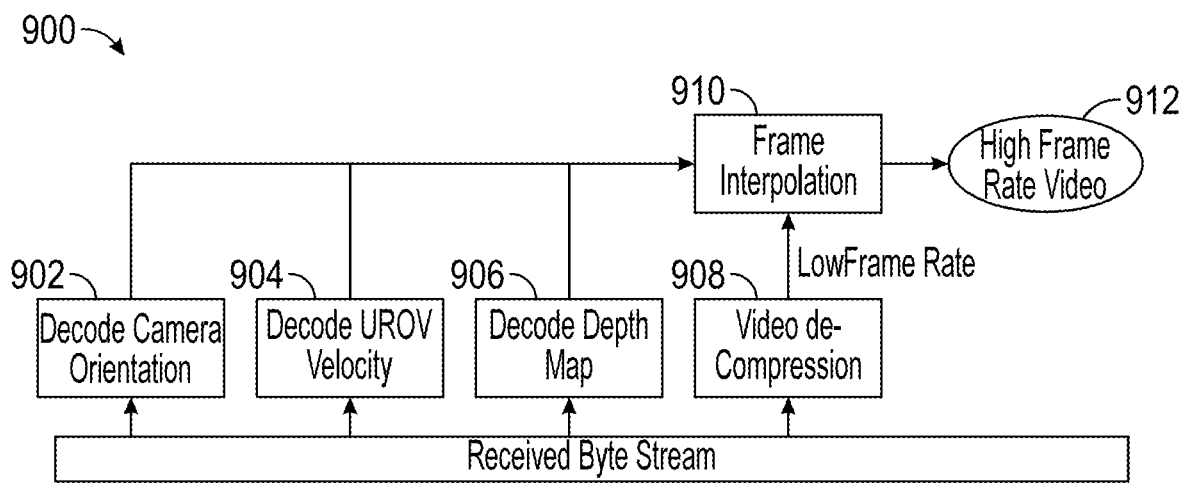
FIG. 9 illustrates a flowchart of a de-compression process for use with the compression process of FIG. 8, according to an embodiment.

An example of a process 900 for up-sampling the video stream, e.g., to the original frame rate, at the surface is shown in FIG. 9. The process 900 may include decoding the camera orientation, as at 902 and the UROV velocity, as at 904. These parameters may be used to estimate the camera location in the missing views. The process 900 may also include decoding the depth map, as at 906. The process 900 may further include decompressing the video, as at 908, which may have a relatively low frame rate, e.g., with certain frames removed during the compression process 800 of FIG. 8. The decoded depth map and the key frames (passed through the received byte stream from the subsea device) are then used to interpolate missing frames from the decompressed video using view synthesis processes, as at 910. The result may be a high frame rate, interpolated video stream, at 912

In the view synthesis block 908, the scene may be assumed to be stationary. If the scene is dynamic, then additional modeling of the motion can be used. Bayesian/Kalman filtering may be used for this purpose. Furthermore, motion vectors decoded from the video stream may also or instead be used to model the scene dynamics.

Region of Interest Video Coding Compression

The reconstruction quality of foreground and background objects may be adjusted by changing parameters, in a process known as "region of interest coding". In oil and gas underwater operations, these objects of interest are well defined and include, for example: manifolds, pipes, christmas trees, and leaks. To improve the reconstruction quality, the objects may be detected using image processing techniques or by active/passive markers. The location of the objects can then be used to define a region of interest for a video compression algorithm.

Figure 10:
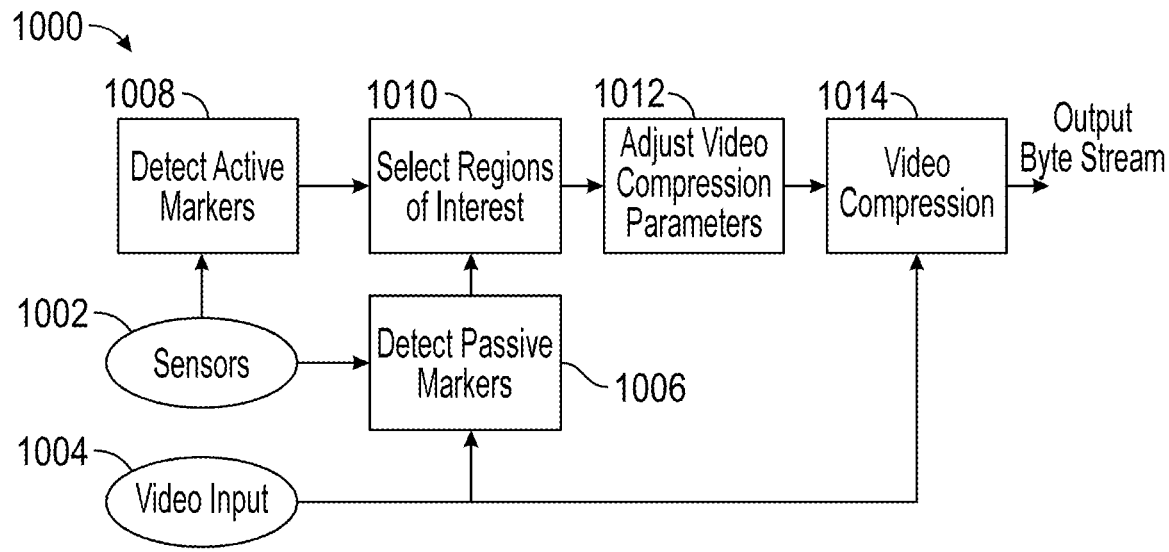
FIG. 10 illustrates a flowchart of another compression process, according to an embodiment.

An example of a compression process 1000 that employs such coding is shown in FIG. 10. As shown, the compression process 1000 may include receiving input from sensors, as at 1002, as well as video input, as at 1004. The process 1000 may also include detecting passive markers, as at 1006. This may include detection based on an object's shape, color, or by predefined patterns placed on the equipment. The passive detection may also be run on other sensors such as ultrasound imaging, temperature or pressure sensors. The passive markers thus identify structures in the video. For example, passive algorithms include using image processing techniques to identify specific objects, such as manifolds, Christmas trees, pipes, or particular patterns which are placed on objects to aid object detection.

In addition to or in lieu of such passive markers, active markers may be used to improve the detection accuracy, as determined at 1008, based on sensor and video input. Active markers may include the use of acoustic transducers, temperature, light modulation, pressure, or chemical signals.

Sensors attached to subsea device can detect these markers and indicate regions of interest to a video compression algorithm, as at 1010. Based on the active and/or passive markers, the process 1000 may include adjusting video compression parameters, as at 1012. For example, the quantization step-size in the region of interest, and the quantization step-size in the background region of the image/video. The video may then be compressed, as at 1014, using the adjusted compression parameters.

Adaptive Data Stream Selection in a Multi-View Sensor Array

The subsea device may be equipped with a multi-view camera (or point-cloud sensor) array, at least some of the cameras observe different parts of a scene. In operation, a single view may be available to the user at the surface due to the telemetry bit-rate.

Figure 11:
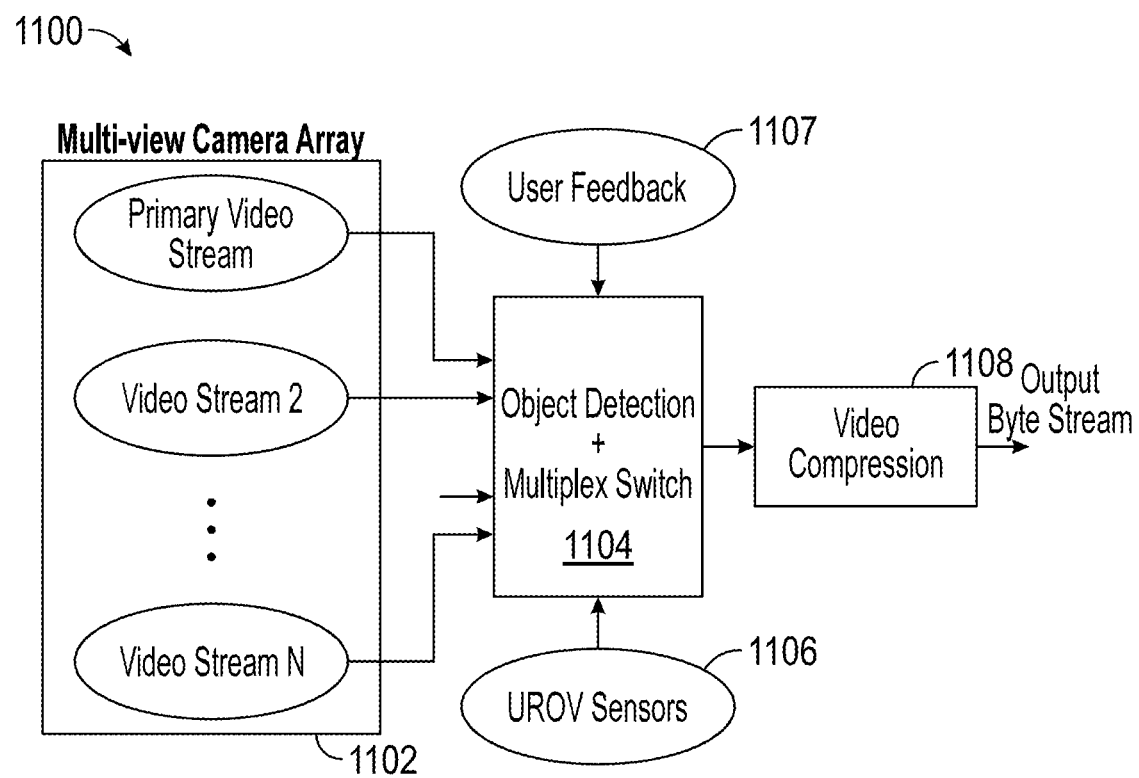
FIG. 11 illustrates a flowchart of an adaptive data stream selection process, according to an embodiment.

In an embodiment of the present disclosure, camera switching may be performed autonomously by the subsea system. FIG. 11 illustrates an example of a process 1100 for automatically switching data streams, according to an embodiment. The data streams may be image/video streams, point cloud data streams, or others. Video streams are employed herein as an illustrative example.

Each of the video streams in block 1102 (e.g., each from a different camera) may be passed into an object detection and multiplex switch at block 1104. The object detection and multiplex switch 1104 may be configured to identify events of interest in the different video streams. The object detection and multiplex switch 1104 can be run on each view independently or jointly on various views. This stage can also use several different, available sensors 1106 on the subsea device, such as point-cloud sensors (e.g., LiDAR) or ultrasonic imaging. After the event detection stage, a multiplex switch (e.g., part of the object detection block 1104) selects a particular view for compression and transmission.

User feedback (via a downlink) as at 1107 can also be used to make a decision on what view transmitted. The video may then be compressed, as at 1108 according to any suitable video compression technique, and then sent to the surface.

Processing Environment

In one or more embodiments, the functions described can be implemented in hardware, software, firmware, or any combination thereof, which may be located on the subsea device, the surface platform, or elsewhere. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 12:
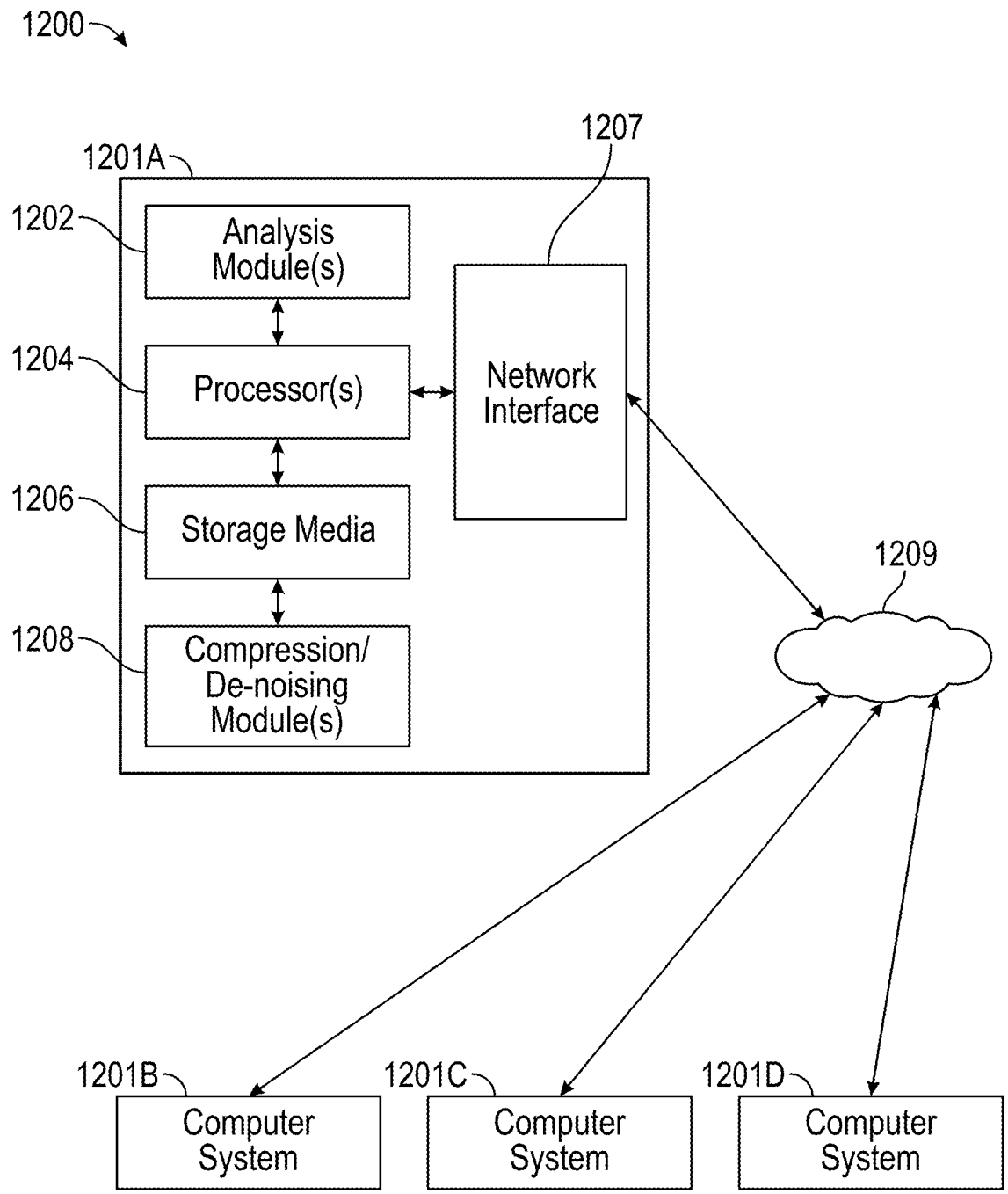
FIG. 12 illustrates a schematic of a computing system, according to an embodiment.

In some embodiments, any of the methods of the present disclosure may be executed by a computing system. FIG. 12 illustrates an example of such a computing system 1200, in accordance with some embodiments. The computing system 1200 may include a computer or computer system 1201A, which may be an individual computer system 1201A or an arrangement of distributed computer systems. The computer system 1201A includes one or more analysis module(s) 1202 configured to perform various tasks according to some embodiments, such as one or more methods disclosed herein. To perform these various tasks, the analysis module 1202 executes independently, or in coordination with, one or more processors 1204, which is (or are) connected to one or more storage media 1206. The processor(s) 1204 is (or are) also connected to a network interface 1207 to allow the computer system 1201A to communicate over a data network 1209 with one or more additional computer systems and/or computing systems, such as 1201B, 1201C, and/or 1201D (note that computer systems 1201B, 1201C and/or 1201D may or may not share the same architecture as computer system 1201A, and may be located in different physical locations, e.g., computer systems 1201A and 1201B may be located in a processing facility, while in communication with one or more computer systems such as 1201C and/or 1201D that are located in one or more data centers, and/or located in varying countries on different continents).

A processor can include a microprocessor, microcontroller, processor module or subsystem, programmable integrated circuit, programmable gate array, or another control or computing device.

The storage media 1206 can be implemented as one or more computer-readable or machine-readable storage media. Note that while in the example embodiment of FIG. 12 storage media 1206 is depicted as within computer system 1201A, in some embodiments, storage media 1206 may be distributed within and/or across multiple internal and/or external enclosures of computing system 1201A and/or additional computing systems. Storage media 1206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1200 contains one or more compression/de-noising module(s) 1208. In the example of computing system 1200, computer system 1201A includes the compression/de-noising module 1208. In some embodiments, a single compression/de-noising module may be used to perform some or all aspects of one or more embodiments of the methods. In alternate embodiments, a plurality of compression/de-noising modules may be used to perform some or all aspects of methods.

It should be appreciated that computing system 1200 is only one example of a computing system, and that computing system 1200 may have more or fewer components than shown, may combine additional components not depicted in the example embodiment of FIG. 12, and/or computing system 1200 may have a different configuration or arrangement of the components depicted in FIG. 12. The various components shown in FIG. 12 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1200, FIG. 12), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for transmitting data from a subsea device to a surface device, comprising:

acquiring data using one or more sensors of the subsea device, wherein the data represents a subsea environment;

compressing the data using one or more processors of the subsea device, wherein compressing the data comprises partitioning the data into a low-resolution representation and one or more enhancement layers that are higher in resolution than the low-resolution representation;

transmitting the low-resolution representation wirelessly from the subsea device to the surface device, wherein the surface device is configured to:
receive and decompress the low-resolution representation, and
view a first set of images represented by the low-resolution representation; and after transmitting the low-resolution representation, transmitting the one or more enhancement layers in sequence of increasing resolution, wherein the surface device is further configured to:
receive and decompress the one or more enhancement layers; and
view a second set of images represented by the one or more enhancement layers and the low-resolution representation after receiving and decompressing the one or more enhancement layers.

2. The method of claim 1, wherein:
compressing the data comprises down-sampling the data such that a frame rate of images represented by the data is reduced;
transmitting the data comprises transmitting the down-sampled data; and
decompressing comprises interpolating by the surface device, the down-sampled data to generate an up-sampled data having a greater frame-rate than the down-sampled data.

3. The method of claim 2, wherein down-sampling comprises selecting frames based on a velocity of the subsea device.

4. The method of claim 1, further comprising:
de-noising the data using the one or more processors of the subsea device, prior to compressing the data, wherein de-noising comprises detecting one or more outlier datapoints and removing the one or more outlier datapoints from the data prior to compressing the data.

5. The method of claim 1, wherein:
compressing the data comprises:
identifying a physical object represented by a portion of the data;
selecting a model from a library of models, wherein the model selected represents the physical object; and
determining a deviation of the physical object in the data from the model;
transmitting the data comprises transmitting an identification of the model and the deviation;
decompressing comprises selecting the identified model and applying the deviation; and
the method further comprises updating the model in the library of models based on the deviation.

6. The method of claim 1, further comprising de-noising an image represented by the data by combining a first measurement taken using a first sensor of the one or more sensors and a second measurement using an optical device of the one or more sensors of the subsea device.

7. The method of claim 1, wherein the data comprises LiDAR data, visualization data, point cloud data, or any combination thereof, wherein each data point of the data comprises a three-dimensional vector.

8. The method of claim 1, wherein compressing the data comprises:
identifying regions of interest in images represented by the data using passive markers, active markers, or both; and
adjusting video compression parameters, to assist in reconstruction of the data in the regions of interest.

9. The method of claim 1, wherein the surface device is further configured to receive and decompress the one or more enhancement layers while viewing the first set of images represented by the low-resolution representation.

10. The method of claim 1, wherein the second set of images represented by the one or more enhancement layers and the low-resolution representation comprises an improvement in quality over the first set of images represented by the low-resolution representation.

11. The method of claim 1, wherein:
the one or more enhancement layers comprises a first enhancement layer and a second enhancement layer, wherein the second enhancement layer is higher in resolution than the first enhancement layer, and wherein the second set of images is represented by the first enhancement layer and the low-resolution representation;
a third set of images is represented by the second enhancement layer, the first enhancement layer, and the low-resolution representation, wherein the third set of images comprises an improvement in quality over the second set of images represented by the first enhancement layer and the low-resolution representation; and
the surface device is further configured to view the third set of images represented by the second enhancement layer, the first enhancement layer, and the low-resolution representation after receiving and decompressing the second enhancement layer.

12. The method of claim 1, wherein transmitting the one or more enhancement layers comprises:
transmitting a first enhancement layer of the one or more enhancement layers wirelessly from the subsea device to the surface device, wherein the surface device is further configured to:
receive and decompress the first enhancement layer while viewing the first set of images represented by the low-resolution representation;
view the second set of images represented by the first enhancement layer and the low-resolution representation; and
after transmitting the first enhancement layer, transmitting a second enhancement layer of the one or more enhancement layers wirelessly from the subsea device to the surface device, wherein the second enhancement layer is higher in resolution than the first enhancement layer, and wherein the surface device is further configured to:
receive and decompress the second enhancement layer while viewing the second set of images represented by the first enhancement layer; and
view a third set of images represented by the second enhancement layer.

13. The method of claim 1, further comprising:
compressing the low-resolution representation as a first portion of a byte stream;
compressing a first enhancement layer of the one or more enhancement layers as a second portion of the byte stream; and compressing a second enhancement layer of the one or more enhancement layers as a third portion of the byte stream, wherein a complete scene of the data is viewable by the surface device when less than or equal to 50% of the byte stream has been received by the surface device.

14. The method of claim 8, wherein adjusting the video compression parameters comprises adjusting quantization step-size based on the identified regions of interest.

\* \* \* \* \*